(12) United States Patent
Jinnai et al.

(10) Patent No.: US 12,072,014 B2
(45) Date of Patent: Aug. 27, 2024

(54) POWER TRANSMISSION DEVICE FOR WORK VEHICLE

(71) Applicant: KUBOTA CORPORATION, Osaka (JP)

(72) Inventors: Atsushi Jinnai, Osaka (JP); Sota Kitamura, Osaka (JP); Koichi Kuroda, Osaka (JP); Hiroshi Yachi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 38 days.

(21) Appl. No.: 17/832,855

(22) Filed: Jun. 6, 2022

(65) Prior Publication Data
US 2022/0397189 A1 Dec. 15, 2022

(30) Foreign Application Priority Data
Jun. 15, 2021 (JP) ................ 2021-099697

(51) Int. Cl.
*F16H 57/031* (2012.01)
*F16H 57/037* (2012.01)
*F16H 57/04* (2010.01)

(52) U.S. Cl.
CPC ......... *F16H 57/031* (2013.01); *F16H 57/037* (2013.01); *F16H 57/0424* (2013.01)

(58) Field of Classification Search
CPC ... F16H 57/031; F16H 57/037; F16H 57/0424
USPC ....................................... 475/220
See application file for complete search history.

(56) References Cited

U.S. PATENT DOCUMENTS

| 4,662,241 | A | * | 5/1987 | Edwards ................ B60K 17/08 74/371 |
| 5,050,447 | A | | 9/1991 | Hayakawa et al. |
| 5,289,738 | A | * | 3/1994 | Szulczewski ........ B60K 17/105 475/83 |
| 8,733,528 | B1 | * | 5/2014 | Goerend ............. F16H 57/0445 184/6.12 |
| 9,810,311 | B1 | | 11/2017 | Zhang et al. |
| 2007/0044587 | A1 | * | 3/2007 | Cho ...................... F16H 57/028 74/650 |

(Continued)

FOREIGN PATENT DOCUMENTS

| JP | 63-180767 | 11/1988 |
| JP | 6-13925 | 2/1994 |

(Continued)

OTHER PUBLICATIONS

Extended European Search Report issued in the corresponding European Patent Application No. 22177323.7 dated Aug. 12, 2022.

(Continued)

*Primary Examiner* — Colby M Hansen
(74) *Attorney, Agent, or Firm* — Greenblum & Bernstein, P.L.C.

(57) ABSTRACT

A power transmission device for a work vehicle includes: a transmission case; a gear transmission contained in the transmission case and configured to receive motive power from a power source; a differential mechanism contained in the transmission case and configured to receive motive power from the gear transmission and transmit the motive power to a left wheel and a right wheel; and a gear cover covering a lower portion of a ring gear of the differential mechanism.

3 Claims, 7 Drawing Sheets

(56) References Cited

U.S. PATENT DOCUMENTS

2016/0377164 A1 12/2016 Fast et al.
2021/0332875 A1 10/2021 Tsuchida et al.

FOREIGN PATENT DOCUMENTS

| JP | 2008-240822 | 10/2008 |
| JP | 2019-95058 A | 6/2019 |
| JP | 2019-152278 | 9/2019 |
| WO | 2019/177882 A1 | 9/2019 |

OTHER PUBLICATIONS

Office Action issued in Corresponding JP Patent Application No. 2021-099697, dated Feb. 27, 2024, along with an English translation thereof.

* cited by examiner

POWER TRANSMISSION DEVICE FOR WORK VEHICLE

TECHNICAL FIELD

The present invention relates to a power transmission device for a work vehicle.

BACKGROUND ART

A power transmission device for a work vehicle may include a transmission case, a gear transmission contained in the transmission case and configured to receive motive power from a power source, and a differential mechanism contained in the transmission case and configured to receive motive power from the gear transmission and transmit the motive power to a left wheel and a right wheel.

Japanese Unexamined Patent Application Publication, Tokukai, No. 2019-95058 (JP 2019-95058A) discloses a power transmission structure as an example power transmission device of the above type. The power transmission structure includes a gear transmission ("speed-changing power transmission device", "forward/backward travel switching device") and a differential mechanism ("rear-wheel differential mechanism").

SUMMARY OF INVENTION

Technical Problem

There has been a demand for a work vehicle capable of high-speed travel for efficient work. Power transmission devices of the above type are configured such that the transmission case stores lubricating oil inside and that the ring gear of the differential mechanism has a lower portion under the surface of the lubricating oil. Designing a work vehicle capable of traveling at a higher speed leads to the ring gear, whose lower portion is below the surface of lubricating oil, rotating and stirring the lubricating oil at a higher speed. This in turn poses a larger drive load on the ring gear, with the result of an increased loss of power during transmission through the differential mechanism.

The present invention has an object of providing a power transmission device for a work vehicle that is capable of driving wheels at high speeds without increasing the loss of power during transmission through a differential mechanism caused by a ring gear being partially under the surface of lubricating oil.

Solution to Problem

A power transmission device for a work vehicle according to the present invention includes: a transmission case; a gear transmission contained in the transmission case and configured to receive motive power from a power source; a differential mechanism contained in the transmission case and configured to receive motive power from the gear transmission and transmit the motive power to a left wheel and a right wheel; and a gear cover covering a lower portion of a ring gear of the differential mechanism.

The above power transmission device is configured as follows: While the ring gear rotates, its lower portion stirs the lubricating oil. The gear cover serves to prevent such stirring from affecting the entire lubricating oil in the lubricating oil storage space in the transmission case. This allows the rotation speed of the ring gear to be increased without increasing the drive load on the ring gear, thereby making it possible to drive wheels at high speeds without increasing the loss of power during transmission through the differential mechanism.

The power transmission device according to the present invention may preferably be arranged such that the gear cover includes: a front cover portion facing and covering a front side face of the lower portion, the front side face being a first side face of opposite side faces of the lower portion which first side face is provided with teeth; and a lower cover portion extending from a lower end of the front cover portion under the lower portion to cover the lower portion from below.

The above power transmission device is configured as follows: The front cover portion prevents stirring of lubricating oil by the ring gear from affecting that portion of the lubricating oil storage space which faces the front side face of the ring gear. The lower cover portion prevents stirring of lubricating oil by the ring gear from affecting that portion of the lubricating oil storage space which is below the ring gear. This makes it possible to effectively prevent stirring of lubricating oil by the ring gear from affecting the entire lubricating oil in the lubricating oil storage space, thereby making it possible to drive wheels at higher speeds without increasing the loss of power during transmission through the differential mechanism.

The power transmission device according to the present invention may preferably be arranged such that the gear cover has a through hole that is in a lower end portion of the front cover portion which lower end portion is downstream of the lower portion in a direction in which the ring gear rotates and that allows lubricating oil to flow out.

The above power transmission device is configured as follows: The lower portion of the ring gear forces lubricating oil between the lower portion and the gear cover downstream of the lower portion in the rotation direction. The through hole allows the lubricating oil thus forced to flow out of the gear cover. The through hole thereby prevents lubricating oil heated as a result of stirring by the ring gear from stagnating between the gear cover and the lower portion. This prevents a rise in the temperature of lubricating oil between the gear cover and the lower portion.

The power transmission device according to the present invention may preferably be arranged such that the gear cover includes: an upstream fixing portion fixing to the transmission case a first end of the gear cover which first end is upstream of the lower portion in a direction in which the ring gear rotates; and a downstream fixing portion fixing to the transmission case a second end of the gear cover which second end is downstream of the lower portion in the direction in which the ring gear rotates.

The above power transmission device is configured as follows: The upstream fixing portion fixes to the transmission case that end of the gear cover which is upstream of the lower portion in the rotation direction. The downstream fixing portion fixes to the transmission case that end of the gear cover which is downstream of the lower portion in the rotation direction. This allows the gear cover to be fixed to the transmission case firmly against the oil pressure applied to the gear cover by stirring of lubricating oil by the ring gear.

The power transmission device according to the present invention may preferably be arranged such that the gear cover includes: a front cover portion facing and covering a front side face of the lower portion, the front side face being a first side face of opposite side faces of the lower portion which first side face is provided with teeth; a lower cover portion extending from a lower end of the front cover portion under the lower portion to cover the lower portion from below; and a reverse cover portion standing on an end of the lower cover portion which end is opposite to the front cover portion and facing and covering a reverse side face of the lower portion, the reverse side face being a second side face of the opposite side faces of the lower portion which second side face is not provided with teeth.

The above power transmission device is configured as follows: The front cover portion prevents stirring of lubricating oil by the ring gear from affecting that portion of the lubricating oil storage space which faces the front side face of the ring gear. The lower cover portion prevents stirring of lubricating oil by the ring gear from affecting that portion of the lubricating oil storage space which is below the ring gear. The reverse cover portion prevents stirring of lubricating oil by the ring gear from affecting that portion of the lubricating oil storage space which faces the reverse side face of the ring gear. This makes it possible to effectively prevent stirring of lubricating oil by the ring gear from affecting the entire lubricating oil in the lubricating oil storage space, thereby making it possible to drive wheels at higher speeds without increasing the loss of power during transmission through the differential mechanism.

DESCRIPTION OF EMBODIMENTS

The description below deals with an example embodiment of the present invention with reference to drawings.

Figure 1:
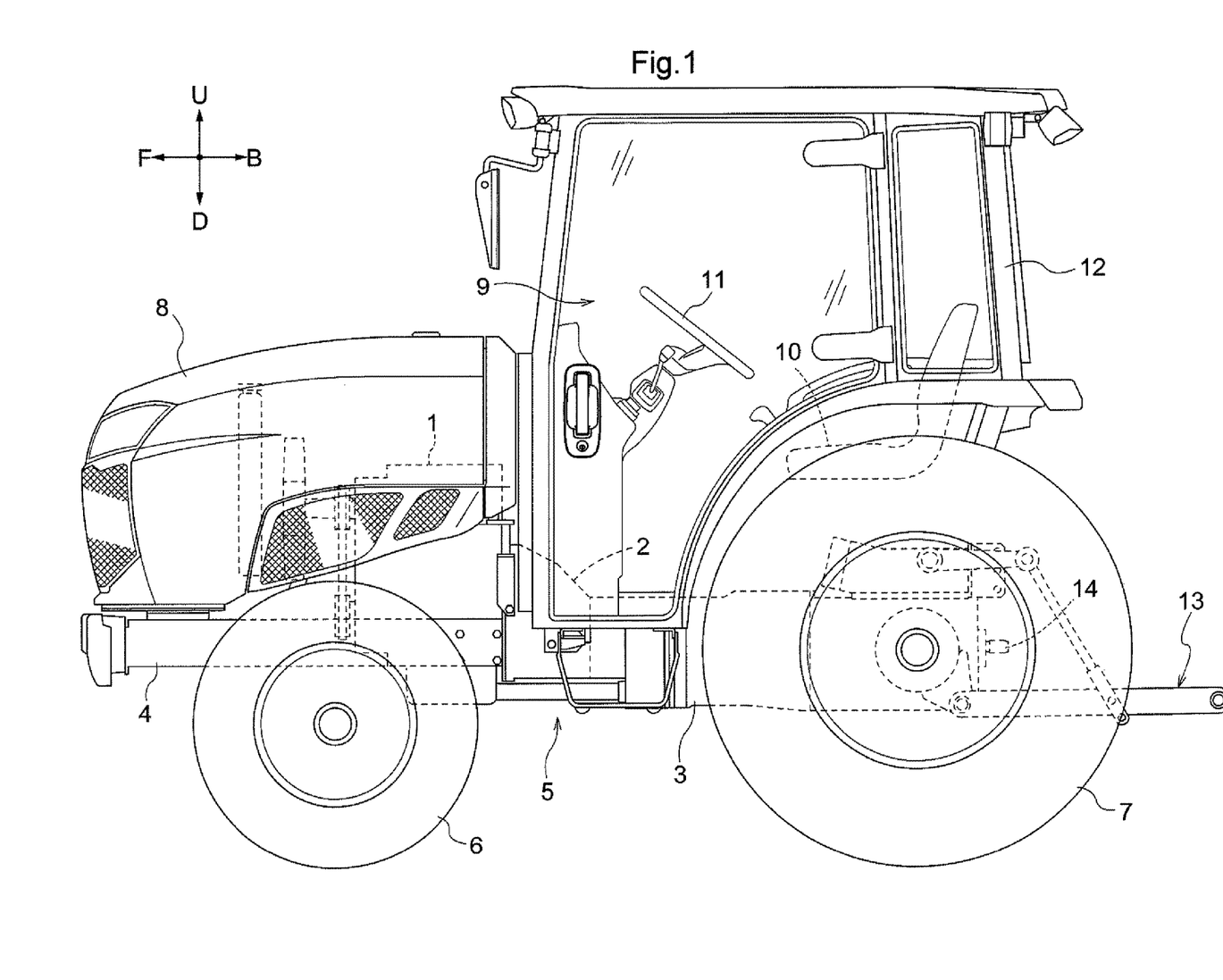
FIG. 1 is a left side view of a tractor in its entirety.

The embodiment described below is for a tractor (which is an example of the "work vehicle") including a body. FIG. 1 shows arrow F to indicate the forward direction of the body, arrow B to indicate the backward direction of the body, arrow U to indicate the upward direction of the body, and arrow D to indicate the downward direction of the body. The front side of the drawing corresponds to the leftward direction of the body, whereas the back side of the drawing corresponds to the rightward direction of the body.

[Overall Configuration of Tractor]

The body of the tractor includes (i) a body frame 5 including components such as an engine 1, (ii) a pair of left and right drivable front wheels 6 disposed at a front portion of the body frame 5 and serving as travel devices, and (iii) a pair of left and right drivable rear wheels 7 disposed at a back portion of the body frame 5 and serving as travel devices. The body frame 5 includes an engine 1, a clutch housing 2 behind the engine 1, a transmission case 3 coupled to the clutch housing 2, and a front frame portion 4. The front wheels 6 are swingable about an axis extending in the up-down direction of the body (not shown in the drawings) to be turned. The body includes at a front portion a motor section 8 containing the engine 1, and also includes a driver section 9 at a back portion. The driver section 9 includes a driver's seat 10, a steering wheel 11 for use to turn the front wheels 6, and a cabin 12 defining a driver space. The body frame 5 has a back portion provided with a link mechanism 13 and a power take-off shaft 14. The link mechanism 13 allows any of various work devices such as a rotary tiller device (not shown in the drawings) to be coupled to the body frame 5 in such a manner as to be capable of being lifted and lowered. The power take-off shaft 14 takes off motive power from the engine 1 and transmits the motive power to a work device coupled to the body frame 5.

[Power Transmission Device]

Figure 2:
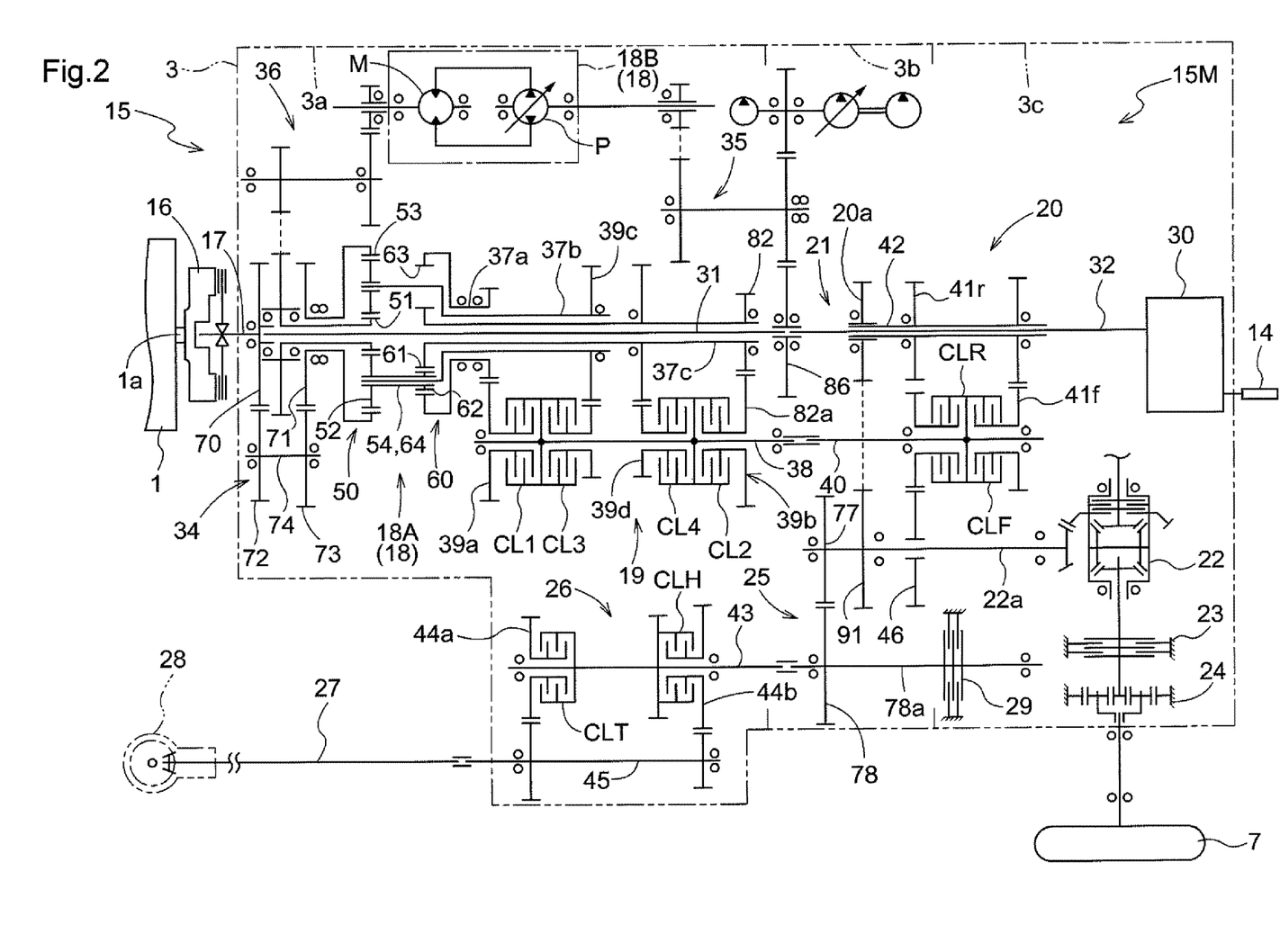
FIG. 2 is a diagram illustrating a power transmission device.

The tractor includes a power transmission device 15 illustrated in FIG. 2. The power transmission device 15 transmits motive power from the engine 1 to the front wheels 6 and the rear wheels 7. The transmission case 3 is included in the power transmission device 15 in such an orientation as to have a front-back direction identical to that of the body.

As illustrated in FIG. 2, the power transmission device 15 includes a transmission case 3 that contains a gear transmission 15M, a rear-wheel differential mechanism 22, and a front-wheel power transmission device 26. The gear transmission 15M includes (i) a main transmission section 18 coupled to the input shaft 17 of the transmission case 3, (ii) a multi-stage power transmission section 19 configured to receive the output of the main transmission section 18, (iii) a forward/rearward travel switching device 20 configured to receive the output of the multi-stage power transmission section 19, (iv) a rear-wheel gear interlocking mechanism 21 configured to transmit the output of the forward/rearward travel switching device 20 to the rear-wheel differential mechanism 22, and (v) a front-wheel gear interlocking mechanism 25 configured to transmit the output of the forward/rearward travel switching device 20 to the front-wheel power transmission device 26.

The transmission case 3 includes a front case portion 3a, a middle case portion 3b, and a back case portion 3c as segmented in the front-back direction of the transmission case 3. The front case portion 3a contains the main transmission section 18, the multi-stage power transmission section 19, and the front-wheel power transmission device 26. The middle case portion 3b contains the rear-wheel gear interlocking mechanism 21 and the front-wheel gear interlocking mechanism 25. The back case portion 3c contains the forward/rearward travel switching device 20 and the rear-wheel differential mechanism 22.

The main transmission section 18 includes a planetary gear device 18A and a continuously variable transmission device 18B. The planetary gear device 18A has a front portion coupled to a first gear interlocking mechanism 34 configured to allow motive power from the input shaft 17 to be received by the planetary gear device 18A. The continuously variable transmission device 18B has a back portion coupled to a second gear interlocking mechanism 35 configured to allow motive power from the input shaft 17 to be received by the continuously variable transmission device 18B. The continuously variable transmission device 18B has a front portion coupled to a third gear interlocking mechanism 36 configured to allow the output of the continuously variable transmission device 18B to be received by the planetary gear device 18A. The forward/rearward travel switching device 20 has a front portion coupled to the rear-wheel gear interlocking mechanism 21, which is configured to transmit the output of the forward/rearward travel switching device 20 to the rear-wheel differential mechanism 22. The front-wheel power transmission device 26 has a back portion coupled to the front-wheel gear interlocking mechanism 25, which is configured to transmit the output of the forward/rearward travel switching device 20 to the front-wheel power transmission device 26.

As illustrated in FIG. 2, the power transmission device 15 is configured as follows: Motive power outputted by the engine 1 from its output shaft 1a is transmitted through a main clutch 16 to the input shaft 17 of the transmission case 3; the input shaft 17 transmits its motive power to the main transmission section 18; the main transmission section 18 outputs its motive power to the multi-stage power transmission section 19; the multi-stage power transmission section 19 outputs its motive power to the forward/rearward travel switching device 20; and the forward/rearward travel switching device 20 outputs its motive power through the rear-wheel gear interlocking mechanism 21 to the input shaft 22a of the rear-wheel differential mechanism 22. The power transmission device 15 includes a pair of steering brakes 23 and a pair of deceleration mechanisms 24 as a power transmission system for transmitting the output of the rear-wheel differential mechanism 22 to the respective rear wheels 7. The deceleration mechanisms 24 are each in the form of a planetary gear mechanism. The power transmission device 15 includes a rotary shaft 27 and a front-wheel differential mechanism 28. The front-wheel gear interlocking mechanism 25 transmits motive power from the input shaft 22a of the rear-wheel differential mechanism 22 to the front-wheel power transmission device 26, which then transmits the motive power through the rotary shaft 27 to the front-wheel differential mechanism 28. The front-wheel gear interlocking mechanism 25 is provided with a parking brake 29.

As illustrated in FIG. 2, the power transmission device 15 includes a work transmission device 30. The work transmission device 30 receives motive power from the input shaft 17 through the rotary shaft 31 and a rear rotary shaft 32, varies the motive power, and transmits the resulting motive power to the power take-off shaft 14.

[Main Transmission Section]

The main transmission section 18, as illustrated in FIG. 2, includes a planetary gear device 18A and a continuously variable transmission device 18B. The planetary gear device 18A includes two planetary gear sections 50 and 60 arranged in the front-back direction of the transmission case 3. The forward one of the two planetary gear sections 50 and 60, that is, the planetary gear section 50, is coupled to the input shaft 17 with the first gear interlocking mechanism 34 in-between. The continuously variable transmission device 18B is of a hydrostatic type, and includes a hydraulic pump P with a variable capacity and a hydraulic motor M. The continuously variable transmission device 18B includes a pump shaft coupled to the input shaft 17 with the second gear interlocking mechanism 35 and the rotary shaft 31 in-between. The continuously variable transmission device 18B includes a motor shaft coupled to the planetary gear section 50 with the third gear interlocking mechanism 36 in-between.

The main transmission section 18 is configured as follows: The continuously variable transmission device 18B varies motive power from the engine 1. The planetary gear device 18A receives the varied motive power and motive power transmitted from the engine 1 through the third gear interlocking mechanism 36. The planetary gear sections 50 and 60 composite the two motive powers. The planetary gear device 18A allows the composite motive power to be outputted from a first output shaft 37a, a second output shaft 37b, and a third output shaft 37c, which coaxially overlap with one another.

[Multi-Stage Power Transmission Section]

The multi-stage power transmission section 19, as illustrated in FIG. 2, includes an output shaft 38 and first to fourth clutches CL1 to CL4 disposed on the output shaft 38 for respective stages and each configured to receive the output of the planetary gear device 18A.

The multi-stage power transmission section 19 is configured such that appropriately operating the continuously variable transmission device 18B and the four clutches CL1 to CL4 allows the composite motive power from the planetary gear device 18A to be outputted from the output shaft 38 in one of four speed ranges.

Figure 3:
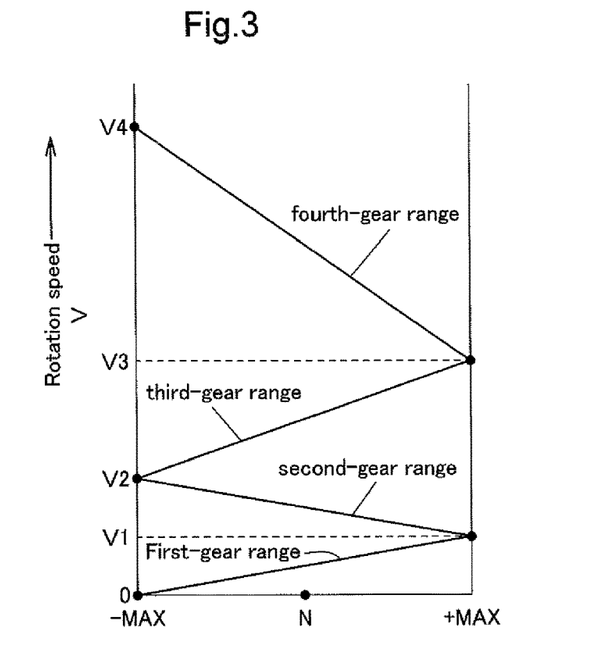
FIG. 3 is a graph that shows the relationship among the speed change state of a continuously variable transmission device, the speed range, and the rotation speed of the output shaft of a multi-stage power transmission section.

FIG. 3 is a graph that shows the relationship among the speed change state of the continuously variable transmission device 18B, the speed range, and the rotation speed V of the output shaft 38 of the multi-stage power transmission section 19. The graph has a vertical axis indicative of the rotation speed V of the output shaft 38 and a horizontal axis indicative of the speed change state of the continuously variable transmission device 18B. The symbol "N" indicates the neutral state, "+MAX" indicates the state of changing the speed to its maximum in the normal rotation direction, and "−MAX" indicates the state of changing the speed to its maximum in the reverse rotation direction.

Engaging the first clutch CL1 and operating the continuously variable transmission device 18B causes motive power from the first output shaft 37a to be varied by a first-gear interlocking mechanism 39a and the first clutch CL1 and then outputted from the output shaft 38. As illustrated in FIG. 3, the output shaft 38 has a rotational speed within a first-gear range. Varying the continuously variable transmission device 18B from "−MAX" to "+MAX" increases the rotation speed V of the output shaft 38 continuously from zero speed ("0") to the maximum speed within the first-gear range ("V1").

Engaging the second clutch CL2 and operating the continuously variable transmission device 18B causes motive power from the third output shaft 37c to be varied by a second-gear interlocking mechanism 39b and the second clutch CL2 and then outputted from the output shaft 38. As illustrated in FIG. 3, the output shaft 38 has a rotational speed within a second-gear range, which covers higher speeds than the first-gear range. Varying the continuously variable transmission device 18B from "+MAX" to "−MAX" increases the rotation speed V of the output shaft 38 continuously from the minimum speed within the second-gear range ("V1") to the maximum speed within the second-gear range ("V2").

Engaging the third clutch CL3 and operating the continuously variable transmission device 18B causes motive power from the second output shaft 37b to be varied by a third-gear interlocking mechanism 39c and the third clutch CL3 and then outputted from the output shaft 38. As illustrated in FIG. 3, the output shaft 38 has a rotational speed within a third-gear range, which covers higher speeds than the second-gear range. Varying the continuously variable transmission device 18B from "−MAX" to "+MAX" increases the rotation speed V of the output shaft 38 continuously from the minimum speed within the third-gear range ("V2") to the maximum speed within the third-gear range ("V3").

Engaging the fourth clutch CL4 and operating the continuously variable transmission device 18B causes motive power from the third output shaft 37c to be varied by a fourth-gear interlocking mechanism 39d and the fourth clutch CL4 and then outputted from the output shaft 38. As illustrated in FIG. 3, the output shaft 38 has a rotational speed within a fourth-gear range, which covers higher speeds than the third-gear range. Varying the continuously variable transmission device 18B from "+MAX" to "−MAX" increases the rotation speed V of the output shaft 38 continuously from the minimum speed within the fourth-gear range ("V3") to the maximum speed within the fourth-gear range ("V4").

[Forward/Rearward Travel Switching Device]

The forward/rearward travel switching device 20, as illustrated in FIG. 2, includes (i) an input shaft 40 coupled to the output shaft 38 of the multi-stage power transmission section 19, (ii) a forward-travel clutch CLF and a rearward-travel clutch CLR both disposed on the input shaft 40, and (iii) an output shaft 42 coupled to the forward-travel clutch CLF with a forward-travel gear mechanism 41f in-between and to the rearward-travel clutch CLR with a rearward-travel gear mechanism 41r in-between. As illustrated in FIG. 2, the rearward-travel gear mechanism 41r includes a reverse rotation gear 46 meshing with teeth on an output rotary member of the rearward-travel clutch CLR. The reverse rotation gear 46 is supported by the input shaft 22a of the rear-wheel differential mechanism 22 in such a manner as to be rotatable relative to the input shaft 22a.

The forward/rearward travel switching device 20 is configured as follows: Engaging the forward-travel clutch CLF causes motive power transmitted from the multi-stage power transmission section 19 to the input shaft 40 to be converted by the forward-travel clutch CLF and the forward-travel gear mechanism 41f into forward-travel motive power and then outputted from the output shaft 42. Engaging the rearward-travel clutch CLR causes motive power transmitted from the multi-stage power transmission section 19 to the input shaft 40 to be converted by the rearward-travel clutch CLR and the rearward-travel gear mechanism 41r into rearward-travel motive power and then outputted from the output shaft 42. The output shaft 42 transmits the forward-travel motive power and the rearward-travel motive power to the rear-wheel gear interlocking mechanism 21, which then transmits them to the input shaft 22a of the rear-wheel differential mechanism 22.

[Front-Wheel Power Transmission Device]

The front-wheel power transmission device 26, as illustrated in FIG. 2, includes (i) an input shaft 43 coupled to the input shaft 22a of the rear-wheel differential mechanism 22 with the front-wheel gear interlocking mechanism 25 in-between, (ii) a constant-rate clutch CLT and a rate-increasing clutch CLH both disposed on the input shaft 43, and (iii) an output shaft 45 coupled to the constant-rate clutch CLT with a constant-rate gear mechanism 44a in-between and to the rate-increasing clutch CLH with a rate-increasing gear mechanism 44b in-between.

The front-wheel power transmission device 26 is configured as follows: Engaging the constant-rate clutch CLT causes motive power transmitted from the input shaft 22a of the rear-wheel differential mechanism 22 to the input shaft 43 to be further transmitted through the constant-rate clutch CLT and the constant-rate gear mechanism 44a to the output shaft 45 and then to the front-wheel differential mechanism 28. This achieves four-wheel drive with a constant rate for the front and rear wheels, that is, the tractor drives the front wheels 6 and the rear wheels 7 at respective average circumferential speeds substantially equal to each other. Engaging the rate-increasing clutch CLH causes motive power transmitted from the input shaft 22a of the rear-wheel differential mechanism 22 to the input shaft 43 to be further transmitted through the rate-increasing clutch CLH and the rate-increasing gear mechanism 44b to the output shaft 45 and then to the front-wheel differential mechanism 28. This achieves four-wheel drive with an increased rate for the front wheels, that is, the tractor drives the front wheels 6 at a first average circumferential speed and the rear wheels 7 at a second average circumferential speed, the first average circumferential speed being higher than the second average circumferential speed.

[Planetary Gear Device]

The planetary gear device 18A, as illustrated in FIG. 2, includes two planetary gear sections 50 and 60 arranged in the front-back direction of the transmission case 3 (composite planetary gear device). The description below refers to the front one of the two planetary gear sections 50 and 60 as "first planetary gear section 50" and the back one thereof as "second planetary gear section 60".

[First Planetary Gear Section]

The first planetary gear section 50, as illustrated in FIG. 2, includes (i) a first sun gear 51, (ii) a first planetary gear 52 meshing with the first sun gear 51, (iii) a first internally toothed gear 53 meshing with the first planetary gear 52, and (iv) a first carrier 54 that supports the first planetary gear 52 in such a manner that the first planetary gear 52 is rotatable and that is configured to rotate about the axis of the first sun gear 51 together with the first planetary gear 52 revolving about the first sun gear 51.

[Second Planetary Gear Section]

The second planetary gear section 60, as illustrated in FIG. 2, includes (i) a second sun gear 61, (ii) a second planetary gear 62 meshing with the second sun gear 61, (iv) a second internally toothed gear 63 meshing with the second planetary gear 62, and (iv) a second carrier 64 that supports the second planetary gear 62 in such a manner that the second planetary gear 62 is rotatable and that is configured to rotate about the axis of the second sun gear 61 together with the second planetary gear 62 revolving about the second sun gear 61.

The first planetary gear section 50 includes a power transmission gear (not shown in the drawings) meshing with the first planetary gear 52. The planetary gear device 18A includes a coupling member (not shown in the drawings) extending from the first planetary gear section 50 to the second planetary gear section 60 and coupling the power transmission gear to the second planetary gear 62 in an interlocking manner. The first carrier 54 of the first planetary gear section 50 is coupled to the second carrier 64 of the second planetary gear section 60 in such a manner that the first carrier 54 and the second carrier 64 are rotatable integrally with each other.

[Second-Gear Interlocking Mechanism]

As illustrated in FIG. 2, the second-gear interlocking mechanism 39b includes (i) an output power transmission gear 82 disposed on the third output shaft 37c and (ii) an input gear 82a disposed on an input member of the second clutch CL2 and meshing with the output power transmission gear 82.

[Second Gear Interlocking Mechanism]

As illustrated in FIG. 2, the second gear interlocking mechanism 35 includes a pump power transmission gear 86 disposed backward of the output power transmission gear 82 and coupled to the rotary shaft 31. The pump power transmission gear 86 is configured to take off motive power, which has been transmitted from the input shaft 17 to the rotary shaft 31, from the rotary shaft 31 and transmit the motive power to the hydraulic pump P.

[First Gear Interlocking Mechanism]

The first gear interlocking mechanism 34, as illustrated in FIG. 2, includes (i) a first power transmission gear 70 disposed on the input shaft 17, (ii) a second power transmission gear 71 coupled to the first internally toothed gear 53, (iii) a first relay gear 72 meshing with the first power transmission gear 70, and (iv) a second relay gear 73 meshing with the second power transmission gear 71. The first gear interlocking mechanism 34 further includes a counter shaft 74 coupling the first relay gear 72 to the second relay gear 73 and supporting the first relay gear 72 and the second relay gear 73.

[Rear-Wheel Gear Interlocking Mechanism]

As illustrated in FIG. 2, the rear-wheel gear interlocking mechanism 21 includes a power transmission gear 91 meshing with the output gear 20a of the forward/rearward travel switching device 20 and configured to transmit motive power from the output gear 20a to the input shaft 22a of the rear-wheel differential mechanism 22. The power transmission gear 91 is supported by the input shaft 22a.

[Front-Wheel Gear Interlocking Mechanism]

As illustrated in FIG. 2, the front-wheel gear interlocking mechanism 25 includes a first power transmission gear 77 disposed on the input shaft 22a of the rear-wheel differential mechanism 22 and a second power transmission gear 78 meshing with the first power transmission gear 77. The second power transmission gear 78 includes a shaft 78a below the input shaft 22a as the shaft of the first power transmission gear 77.

The front-wheel gear interlocking mechanism 25 allows the output of the forward/rearward travel switching device 20 to be transmitted to the front-wheel power transmission device 26 as follows: The output gear 20a of the forward/rearward travel switching device 20 transmits motive power through the power transmission gear 91 and the input shaft 22a to the first power transmission gear 77, which then transmits the motive power through the second power transmission gear 78 and the shaft 78a to the input shaft 43 of the front-wheel power transmission device 26.

[Rear-Wheel Differential Mechanism]

Figure 4:
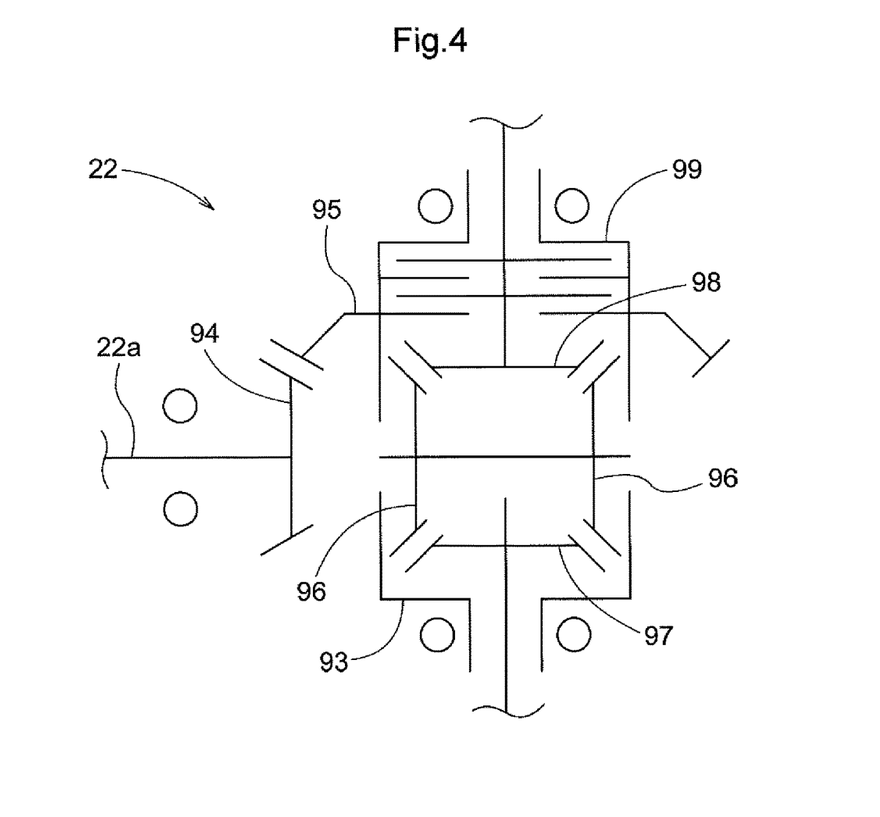
FIG. 4 is a diagram schematically illustrating a rear-wheel differential mechanism.

As illustrated in FIG. 2, the rear-wheel differential mechanism 22 is contained in the back case portion 3c of the transmission case 3. As illustrated in FIG. 4, the rear-wheel differential mechanism 22 includes an input shaft 22a at a front portion and a differential case 93 at a back portion. The input shaft 22a is provided with a drive pinion 94. The differential case 93 has a lateral side portion provided with a ring gear 95 meshing with the drive pinion 94. The differential case 93 contains (i) a pair of differential pinions 96, (ii) a left side gear 97 meshing with the differential pinions 96 and configured to transmit motive power to the left rear wheel 7, and (iii) a right side gear 98 meshing with the differential pinions 96 and configured to transmit motive power to the right rear wheel 7. The differential case 93 has a lateral side portion provided with a differential lock device 99.

Figure 5:
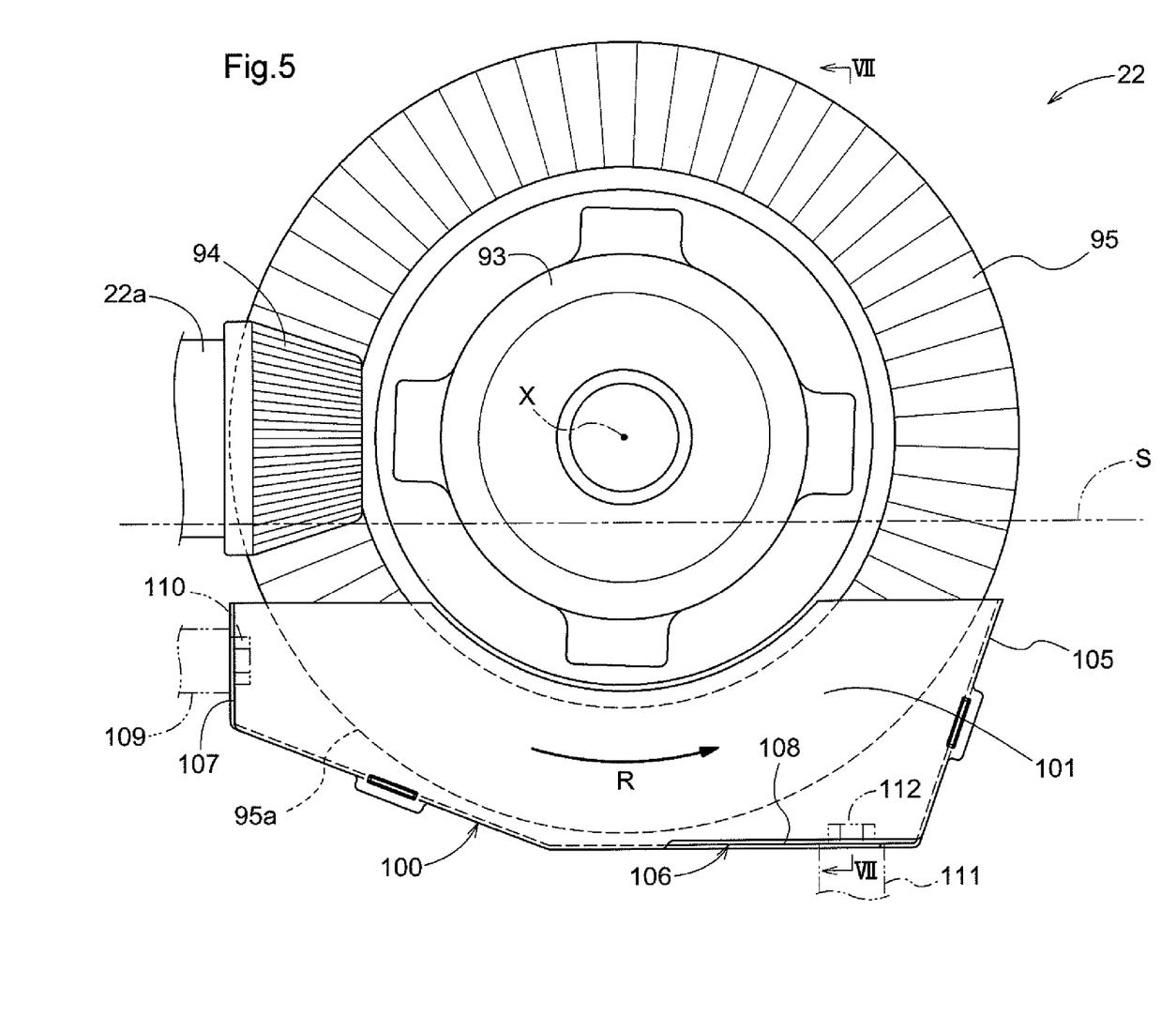
FIG. 5 is a side view of a rear-wheel differential mechanism.

The rear-wheel differential mechanism 22 is configured such that when it transmits forward-travel motive power to the rear wheels 7, the ring gear 95 rotates so that a lower portion 95a thereof rotates in the rotation direction R indicated with an arrow in FIG. 5.

The transmission case 3 is configured to store, in its internal space, lubricating oil for components such as the gear transmission 15M and the rear-wheel differential mechanism 22. The lubricating oil is preferably stored as illustrated in FIG. 5 to have a surface S at a level between the rotation axis X and lower end of the ring gear 95. The rear-wheel differential mechanism 22 is positioned such that the ring gear 95 has a lower portion 95a below the surface S of the lubricating oil.

Figure 6:
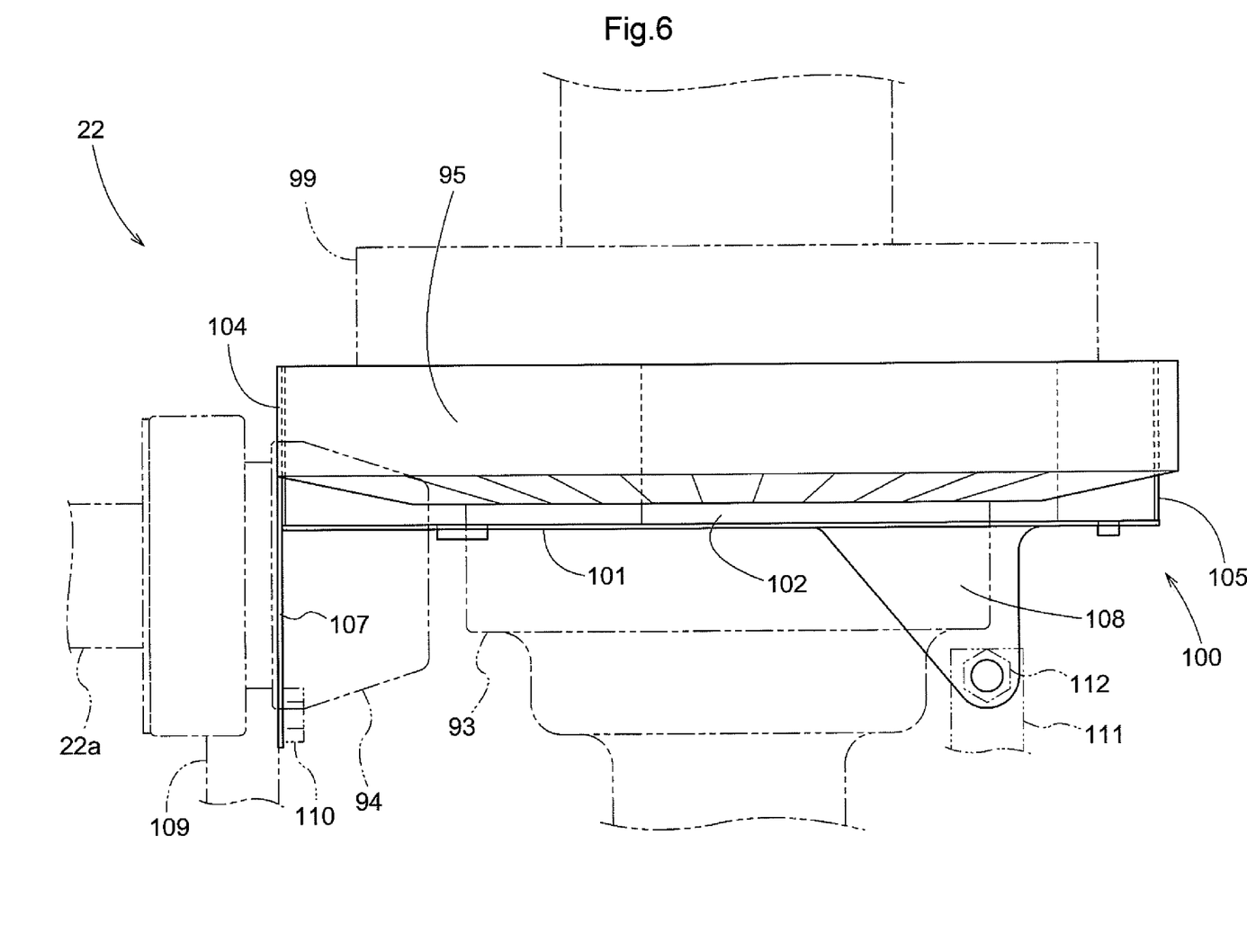
FIG. 6 is a plan view of a rear-wheel differential mechanism.
Figure 7:
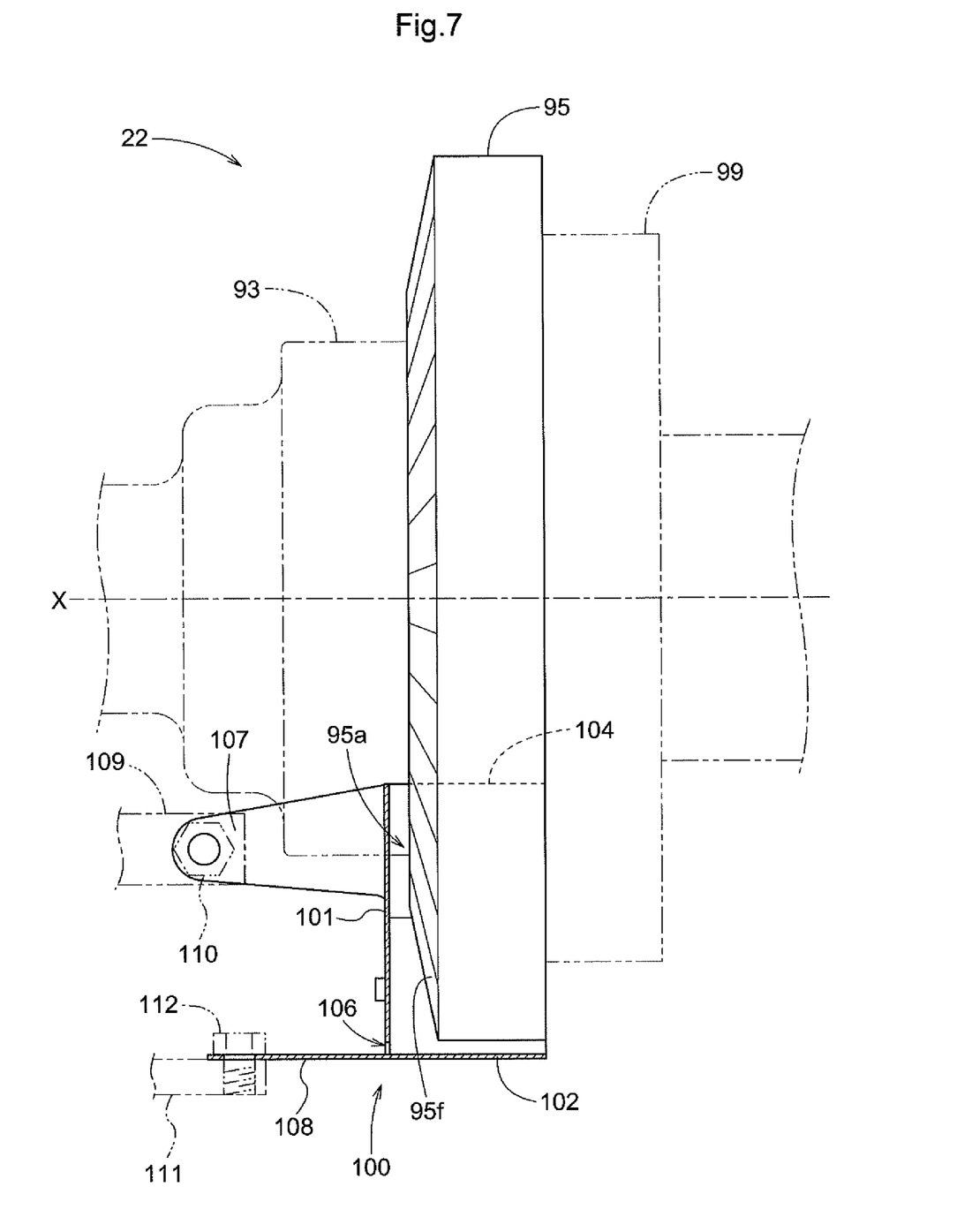
FIG. 7 is a cross-sectional view of the rear-wheel differential mechanism taken along line VII-VII in FIG. 5.

As illustrated in FIGS. 5 to 7, the rear-wheel differential mechanism 22 includes a gear cover 100 covering the lower portion 95a of the ring gear 95. While the ring gear 95 rotates, its lower portion 95a stirs the lubricating oil. The gear cover 100 serves to prevent such stirring from affecting the entire lubricating oil in the lubricating oil storage space in the transmission case.

[Gear Cover]

The gear cover 100, as illustrated in FIGS. 5 to 8, includes a front cover portion 101 and a lower cover portion 102. The front cover portion 101 faces and covers a front side face 95f of the lower portion 95a, the front side face 95f being that one of the opposite side faces of the ring gear 95 which is provided with teeth. The lower cover portion 102 extends from the lower end of the front cover portion 101 under the lower portion 95a to cover the lower portion 95a from below. The front cover portion 101 serves to prevent stirring of lubricating oil by the ring gear 95 from affecting that portion of the lubricating oil storage space which faces the front side face 95f. The lower cover portion 102 serves to prevent stirring of lubricating oil by the ring gear 95 from affecting that portion of the lubricating oil storage space which is under the ring gear 95.

Figure 8:
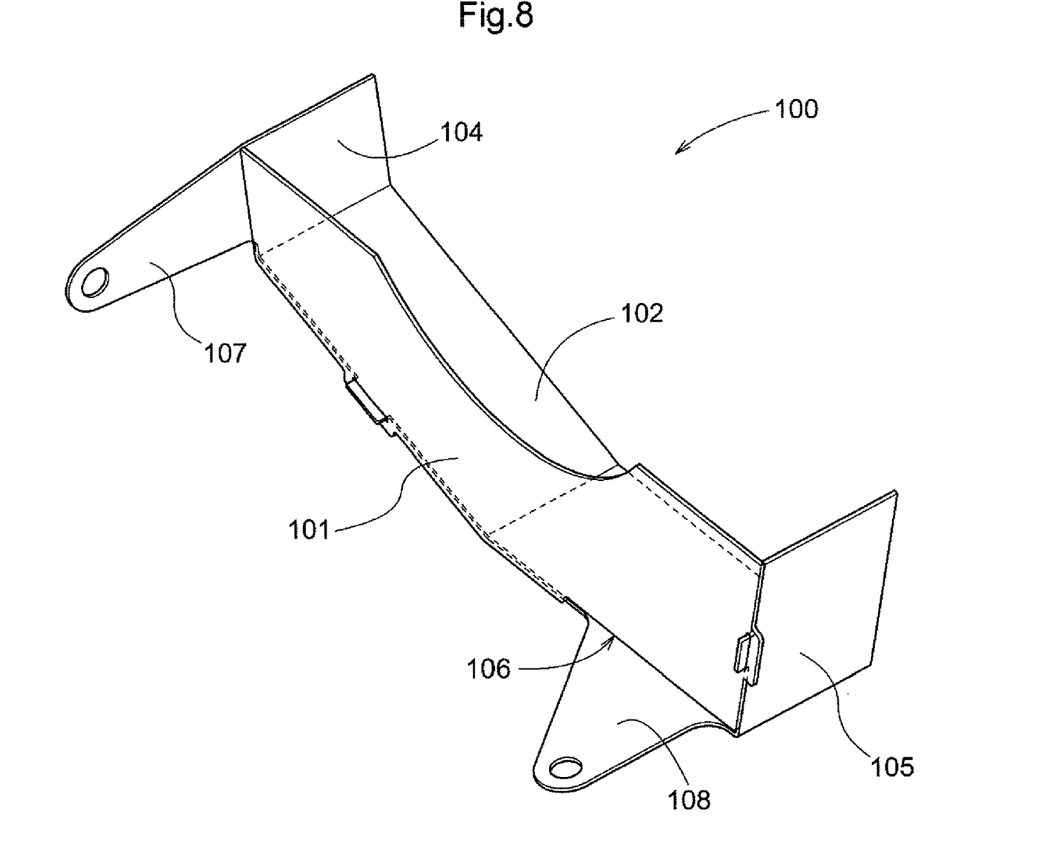
FIG. 8 is a perspective view of a gear cover.

As illustrated in FIGS. 5, 6, and 8, the gear cover 100 includes an upstream vertical cover portion 104 standing on that end of the lower cover portion 102 which is upstream of the lower portion 95a in the rotation direction R. The upstream vertical cover portion 104 is connected with that end of the front cover portion 101 which is upstream of the lower portion 95a in the rotation direction R. The gear cover 100 includes a downstream vertical cover portion 105 standing on that end of the lower cover portion 102 which is downstream of the lower portion 95a in the rotation direction R. The downstream vertical cover portion 105 is connected with that end of the front cover portion 101 which is downstream of the lower portion 95a in the rotation direction R.

As illustrated in FIGS. 5, 7, and 8, the gear cover 100 has a through hole 106 in that lower end portion of the front cover portion 101 which is downstream of the lower portion 95a in the rotation direction R. The through hole 106 allows lubricating oil to flow out. The lower portion 95a of the ring gear 95 forces lubricating oil between the lower portion 95a and the gear cover 100 downstream of the lower portion 95a in the rotation direction R. The through hole 106 allows the lubricating oil thus forced to flow out of the gear cover 100. The through hole 106 thereby prevents lubricating oil heated as a result of stirring by the ring gear 95 from stagnating between the gear cover 100 and the lower portion 95a.

The gear cover 100, as illustrated in FIG. 8, includes an upstream fixing portion 107 at that end which is upstream of the lower portion 95a in the rotation direction R and a downstream fixing portion 108 at that end which is downstream of the lower portion 95a in the rotation direction R. As illustrated in FIGS. 5 to 7, the upstream fixing portion 107 is coupled to a first support 109 of the transmission case 3 with use of a coupling bolt 110, and the downstream fixing portion 108 is coupled to a second support 111 of the transmission case 3 with use of a coupling bolt 112. This results in the gear cover 100 being detachably fixed to the transmission case 3.

Figure 9:
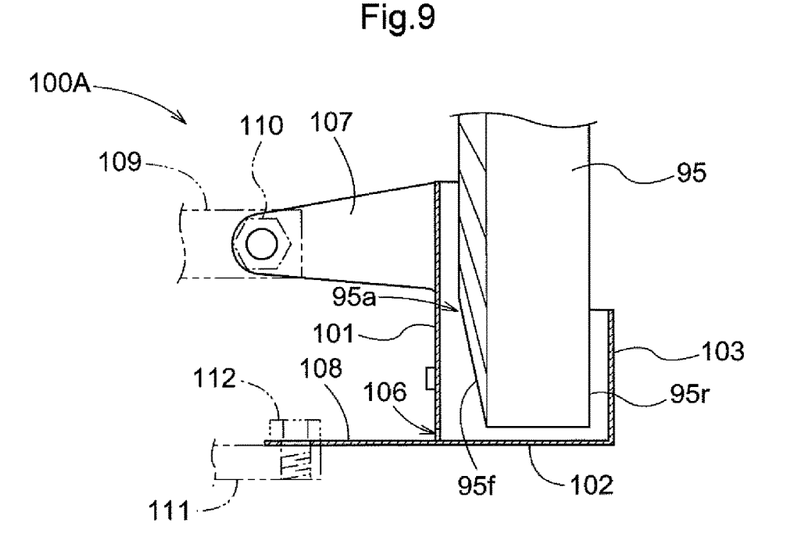
FIG. 9 is a cross-sectional view of a gear cover for an alternative embodiment.

Alternative Embodiments (1) FIG. 9 is a vertical cross section of a gear cover 100A for an alternative embodiment. As illustrated in FIG. 9, the gear cover 100A includes a reverse cover portion 103 in addition to the front cover portion 101 and the lower cover portion 102. The reverse cover portion 103 stands on that end of the lower cover portion 102 which is opposite to the front cover portion 101. The reverse cover portion 103 faces and covers a reverse side face 95r of the lower portion 95a, the reverse side face 95r being that one of the opposite side faces of the ring gear 95 which is provided with no teeth. The reverse cover portion 103 serves to prevent stirring of lubricating oil by the ring gear 95 from affecting that portion of the lubricating oil storage space which faces the reverse side face 95r.

(2) The embodiment described above is an example including an upstream vertical cover portion 104 and a downstream vertical cover portion 105. The gear cover 100 may alternatively not include an upstream vertical cover portion 104 or a downstream vertical cover portion 105.

(3) The embodiment described above is an example with a through hole 106. The gear cover 100 may alternatively not have a through hole 106.

(4) The embodiment described above is an example in which the gear cover 100 is provided for the rear-wheel differential mechanism 22. The embodiment may be altered such that the front-wheel differential mechanism 28 is contained in the transmission case 3 and provided with a gear cover.

(5) The embodiment described above is an example including an engine 1 as a power source configured to supply motive power to the gear transmission 15M. The power source may alternatively be an electric motor instead of an engine, or a combination of an engine and an electric motor.

INDUSTRIAL APPLICABILITY

The present invention is applicable to power transmission devices for use in not only tractors but also various other work vehicles such as combines and multipurpose work vehicles.

The invention claimed is:

1. A power transmission device for a work vehicle, the power transmission device comprising:
a transmission case;
a gear transmission contained in the transmission case and configured to receive motive power from a power source;
a differential mechanism contained in the transmission case and configured to receive motive power from the gear transmission and transmit the motive power to a left wheel and a right wheel; and
a gear cover disposed only below a rotation axis of a ring gear of the differential mechanism and covering only a lower portion of the ring gear,
the gear cover including:
a front cover portion facing and covering a front side face of the lower portion of the ring gear, the front side face being a first side face of opposite side faces of the lower portion of the ring gear, which first side face is provided with teeth;
a lower cover portion extending from a lower end of the front cover portion under the lower portion of the ring gear to cover the lower portion of the ring gear from below; and
a downstream vertical cover portion standing on an end of the lower cover portion, which end is downstream of the lower portion of the ring gear in a direction in which the ring gear rotates.

2. The power transmission device according to claim 1, wherein
the gear cover has a through hole that is in a lower end portion of the front cover portion, in which the lower end portion of the front cover portion is downstream of the lower portion of the ring gear in a direction in which the ring gear rotates and that allows lubricating oil to flow out.

3. The power transmission device according to claim 1, wherein the gear cover further includes:
a reverse cover portion standing on an end of the lower cover portion, which is opposite to the front cover portion and facing and covering a reverse side face of the lower portion of the ring gear, the reverse side face being a second side face of the opposite side faces of the lower portion of the ring gear which second side face is not provided with teeth.

* * * * *

UNITED STATES PATENT AND TRADEMARK OFFICE
CERTIFICATE OF CORRECTION

| | |
|---|---|
| PATENT NO. | : 12,072,014 B2 |
| APPLICATION NO. | : 17/832855 |
| DATED | : August 27, 2024 |
| INVENTOR(S) | : A. Jinnai et al. |

It is certified that error appears in the above-identified patent and that said Letters Patent is hereby corrected as shown below:

In the Claims

Column 12, Line 24 (Claim 1), please change "which end is" to -- which is --.

Signed and Sealed this
Seventeenth Day of December, 2024

Derrick Brent
*Acting Director of the United States Patent and Trademark Office*